United States Patent
Alvord

[19]

[11] Patent Number: 5,803,985
[45] Date of Patent: Sep. 8, 1998

[54] WATER FILL SENSING FOR A DISHWASHER

[75] Inventor: Robert J. Alvord, Elmwood Park, Ill.

[73] Assignee: Eaton Corporation, Cleveland, Ohio

[21] Appl. No.: 617,519

[22] Filed: Mar. 13, 1996

[51] Int. Cl.⁶ .................................................. B08B 7/04
[52] U.S. Cl. ................................. 134/18; 134/57 D
[58] Field of Search .............. 134/57 D, 56 D, 134/58 D, 18; 68/12.02, 12.05, 12.21

[56] References Cited

U.S. PATENT DOCUMENTS

| | | | |
|---|---|---|---|
| 5,291,626 | 3/1994 | Molnar et al. | 134/57 D X |
| 5,313,964 | 5/1994 | Dausch et al. | 134/57 D |
| 5,330,580 | 7/1994 | Whipple, III et al. | 134/18 |
| 5,408,716 | 4/1995 | Dausch et al. | 8/158 |
| 5,419,163 | 5/1995 | Kim et al. | 68/12.02 |
| 5,438,507 | 8/1995 | Kim et al. | 8/158 X |

*Primary Examiner*—Jill Warden
*Assistant Examiner*—Alexander Markoff
*Attorney, Agent, or Firm*—Roger A. Johnston

[57] ABSTRACT

A control system for a dishwasher (10) utilizing a turbidity sensor (24) to achieve an optimum fill cycle water level in a sealable chamber (12) into which soiled dishes are loaded. An electronically actuable fill valve (20) is controlled by a microprocessor (22) in response to signals received from the sensor (24) indicative of the turbidity of water in the chamber (12) during the fill cycle. Once turbidity of the water in the chamber stabilizes or drops to a predefined level, the fill water is determined to have reached an optimum level and the flow of supply water is shut off.

4 Claims, 1 Drawing Sheet

WATER FILL SENSING FOR A DISHWASHER

BACKGROUND AND SUMMARY OF THE INVENTION

This invention relates generally to cleansing appliances such as automatic dishwashers and, more particularly, to an improved sensor and method for efficiently controlling the amount of water provided in a dishwasher fill cycle.

The United States Department of Energy is currently in the process of setting higher efficiency standards which appliances such as washing machines and dishwashers will be required to meet by 1999. In view of greater concerns regarding energy consumption, as well as economic requirements of consumers, a greater focus has been put on energy efficiency in such home appliances. In water handling cleansing machines such as clothes washers and dishwashers, the amount of energy consumed is primarily determined by the amount of energy needed to heat the water used to clean the articles. As an example, most of the energy consumed by a dishwasher is in heating the incoming water from the nominal home water supply temperature of 50° F. to the required inlet temperature of 120° F. Thus, reducing the amount of water used by a dishwasher during one or more cycles can be directly translated into energy savings.

A dishwasher typically receives water from a water supply into a sealed chamber into which dishes are loaded. An electronically controllable valve is used to turn the fill water OFF and ON. A microprocessor based control system is coupled to the fill valve as well as to other electronic system elements such as motors in order to effect the execution of wash cycles. A wash cycle generally includes providing substantially particle free water to the sealed chamber, circulating the water along with various additives such as detergent within the chamber and draining all or a portion of the water out of the chamber. This wash cycle can be followed by one or more rinse cycles where the same process is followed, except without detergent, and even may be preceded with a similar pre-wash cycle. In each type of cycle, generally the same procedure is followed. Water is supplied from the source into the chamber and an internal spraying device is provided for directing streams of water at the dishes to be washed.

Generally, the wash chamber includes a sump at the bottom thereof, having a motor driven pump positioned under the sump to draw water to be supplied under pressure to the spraying device. A reversible motor in the pump drives the pump in one direction to recirculate the water for washing and rinsing and, when reversed, pumps water from the chamber to a drain. To control the amount of water initially provided to the chamber for subsequent use by the spraying device, the valve from the supply is held open, generally for a fixed period of time, as provided for by the controller. This time period, and the amount of water added may be controllably varied according to the selected cycle type, as may be the number of fill cycles performed in a wash process.

Level sensing devices such as floats may alternately be used to control the water level as may flowmeters. However, with any of these devices the fill times and/or levels are typically set to be longer than required in order to ensure that there is enough water available to the pump to get a proper wash, especially when the dishes are heavily soiled. Thus, some extra and unnecessary water is usually admitted into the chamber to make sure that the sprayer receives a sufficient amount of water and to provide a safety margin in order to compensate for variations in house water pressure and the aging of system components. This practice, however, unnecessarily consumes extra water and therefore wastes energy.

The present invention provides a unique solution to the problem of providing a means for ensuring an adequate amount of fill water, even in varying conditions, while saving energy by not using more water than is necessary. Using a turbidity sensor, the scattering effect of suspended particulate matter is monitored in order to determine when the pump is receiving enough water and when the water supply should be shut off. Since air bubbles create an optical scattering effect similar to a solid particle in suspension, and since the suspended matter in a water fill cycle is primarily trapped air, the turbidity sensor functions by looking for cavitation in the fill water.

Cavitation in this instance refers to partial vacuums, or pockets of gas such as air, formed in a liquid such as water. Cavitation originates from the action of the pump as water is let into the wash chamber. The pump operates as water is being provided to the chamber and pumps water to the spray arm for circulation and distribution. However, the amount provided to the chamber is initially insufficient to fill the sump, the spray arm and all other portions of the water circulation and distribution system. Therefore, after the pump has pumped substantially all of the water provided to the chamber, air enters the water distribution subsystem. This produces cavitation in the water as the water is circulated in the chamber. Cavitation of the water during the fill cycle indicates that less than a sufficient amount of water has been received by the chamber for that wash cycle.

As the chamber continues to be filled with water, cavitation substantially diminishes or ceases. This occurs primarily because the pump eventually receives a sufficient amount of water to be able to pump the water in a continuous stream. By monitoring the level of cavitation and using that information to determine a point in time wherein cavitation substantially decreases or approaches cessation, an appropriate but not excessive fill level can be determined. To accomplish this, the level of turbidity is monitored through the fill process. When the amount of turbidity decreases below a certain predetermined level or reaches a certain level of stability, a signal from the turbidity sensor indicates to the dishwasher controller that a sufficient amount of water has been received and that the controller should signal the fill valve to close.

This provides an improved method of effectively controlling the amount of water added to a dishwasher during each fill cycle. It also takes advantage of a growing availability of turbidity sensors already existing in dishwashers. These sensors provide an "eye" into the wash chamber and are most commonly used to provide the controller with information regarding soil levels during wash cycles in order to optimize cleaning time.

These and other features and advantages of the present invention will become apparent upon review of the following description taken in conjunction with the accompanying drawings.

DETAILED DESCRIPTION OF THE PREFERRED EMBODIMENT

Figure 1:
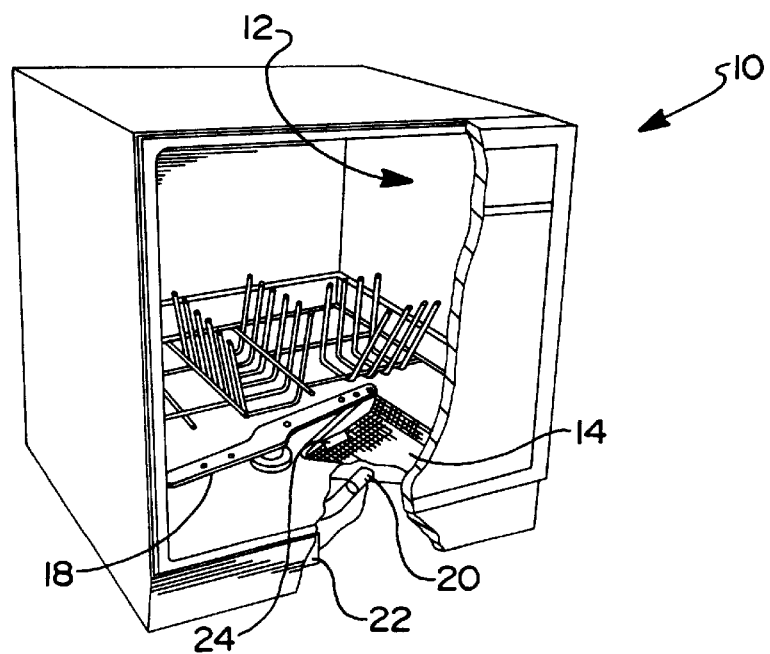
FIG. 1 is a partially cut away perspective view of a dishwasher controlled using the system of the present invention.

Turning now to the drawings, and in particular to FIG. 1, a dishwasher having a control system made in accordance with the present invention is indicated generally at 10. Dishwasher 10 includes a wash chamber 12 into which dishes and the like may be loaded, chamber 12 being sealable and having a sump 14 formed in the bottom thereof. Disposed in sump 14, or at least fluidly connected therewith, is a motor driven pump (not shown) which is also fluidly connected to a spray device 18 for distributing water pumped by the pump throughout the chamber 12. An electronically actuable inlet valve 20 is operable to permit and prohibit the flow of water from a supply into the wash chamber. Valve 20 is electrically connected to a microprocessor-based controller 22 as is a turbidity sensor 24.

Turbidity sensor 24 is preferably disposed so as to measure the scattering effect of particles, or air bubbles in this exemplary embodiment, on light. Generally sensor 24 includes a light source and one or more light sensitive sensors, between which water from chamber 12 is passed. This sensor is preferably disposed in a well formed in the bottom of chamber 12, or alternately in sump 14, or in any position conducive to measuring the turbidity of incoming fill water. Such sensors found to be useful in the present invention include those commonly commercially available from Honeywell Micro Switch in Freeport, Ill. However, it should become readily apparent that any suitable turbidity sensor may be used, that sensor also preferably used by the controller in other wash cycle functions. Sensor 24, irrespective of type, outputs an electrical signal to controller 22 which is indicative of the sensed level of turbidity.

Figure 2:
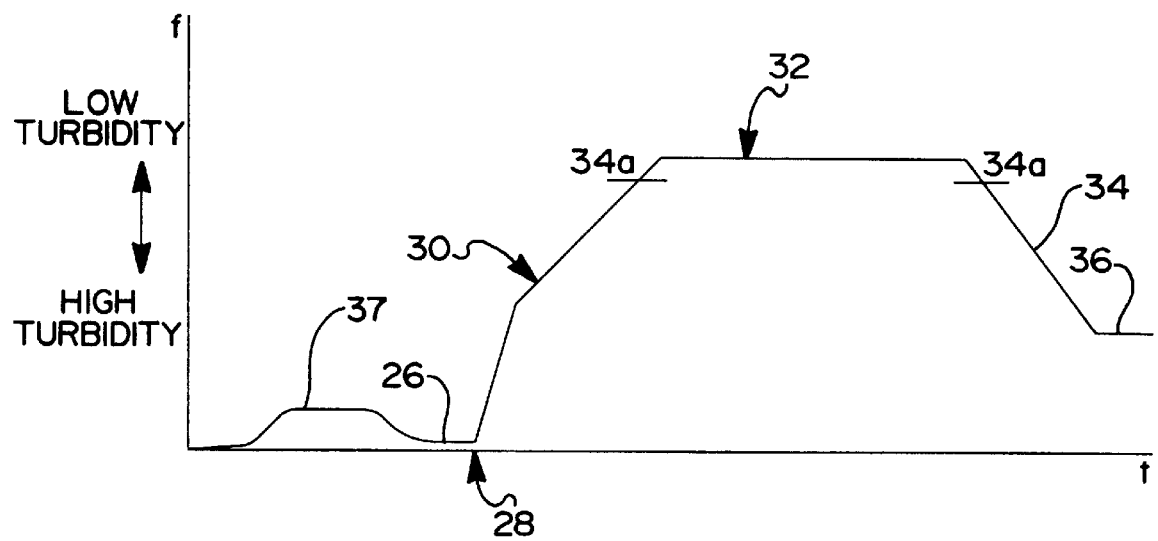
FIG. 2 is a graph illustrating turbidity sensor readings produced by the dishwasher shown in FIG. 1 and controlled according to the method of the present invention.

Turning now to the graph of FIG. 2, a typical output of turbidity sensor 24 is plotted with respect to time. As shown therein, frequency is indicative of turbidity, with a low frequency indicating a high level of turbidity and high frequency indicating low turbidity, but this could alternately be indicated in any suitable fashion, depending upon the specific type of sensor used. As shown in the figure, turbidity is high during the initial fill process. As the water reaches the sensor 24, an increase in scattering due to the line between water and air is sensed as low frequency at 26. As water rises above sensor 24, frequency rises at 28. During this time, valve 20 is opened to allow an unrestricted flow of water into chamber 12.

Since water is just initially flowing into chamber 12, there is not enough water to run pump 14 without cavitation. Therefore, pump 14 is left OFF until the fill water has reached a predetermined minimum amount or level. Because this fill amount only needs to be approximate, any convenient method may be used to determine when this initial fill level has been reached, such as with a timer or using any other method mentioned above.

Once an approximate fill level has been achieved at point 28, pump 14 is turned ON. Thereafter pump 14 draws water from the sump and sends it into spray device 18 for distribution through the wash chamber. Initially, the water level is somewhat low, causing a fairly high degree of cavitation in the water and a corresponding high in turbidity. However, as water fill continues, cavitation progressively decreases along line 30 and turbidity eventually decreases and levels off. At an approximate point 32 wherein turbidity stabilizes, the controller instructs the fill valve 20 to close, thereby stopping the flow of any additional water into the chamber. Similarly, water flow may be stopped at a point wherein turbidity has decreased to a specified level such as indicated at 34a. At this point the designated cycle (wash, rinse, etc.) can continue. Turbidity generally increases along segment 34 as dirt or other sediments enter the water as it is being removed from the dishes being washed.

In the case where turbidity never reaches a predetermined minimum amount or doesn't reach a defined level of stability, the controller preferably fills the wash chamber to a predetermined maximum level, preferably determined by any method discussed above in conjunction with the half fill level. A main reason for the occurrence of this situation may be that the dishes are heavily soiled and as the spray device begins to even initially circulate water within the chamber, sediment is loosened from the dishes and becomes suspended in the water, thereby further increasing turbidity even though there is less air in the water as the fill cycle continues. In such a situation or maximum water level is desired anyway.

Thus, the present invention provides a dishwasher control system and method useful for optimizing the amount of water supplied to a wash chamber during a water fill cycle. The use of the turbidity sensor, a device being implemented more commonly in dishwashers to create "smart" appliances, further increases energy efficiency and eliminates any need for other similar sensors such as floats or level sensors.

The foregoing discussion discloses and describes merely an exemplary embodiment of the present invention. One skilled in the art will readily recognize from such discussion, and from the accompanying drawings and claims, that various changes and modifications can be made therein without departing from the spirit and scope of the invention as defined by the following claims.

What is claimed is:

1. A method of controlling an appliance during a fill cycle thereof comprising the steps of:

providing an appliance having a chamber into which articles are to be placed;

introducing a liquid into the chamber until a minimal amount of liquid sufficient to start operating a pump which circulates the liquid in the chamber is introduced;

thereafter starting the pump and circulating the liquid in the chamber;

continuing introducing the liquid into the chamber while measuring the turbidity of the liquid in the chamber with a turbidity sensor;

continuing the introducing step until the turbidity of the liquid in the chamber stops increasing or until the turbidity reaches a predetermined level or until an amount of liquid sufficient to fill the chamber to a maximum fill level is introduced, whichever is first; and thereafter stopping the introduction of the liquid into the chamber.

2. The method of claim 1 wherein said liquid is water.

3. The method of claim 2 wherein said appliance is an automatic dishwasher.

4. The method of claim 1 wherein said turbidity sensor is disposed within said chamber.

* * * * *